(12) United States Patent
Hogendoorn et al.

(10) Patent No.: US 12,468,314 B2
(45) Date of Patent: Nov. 11, 2025

(54) COMPUTER-IMPLEMENTED METHOD FOR OPERATING A SHUT-OFF DEVICE FOR A FLUID AND A CORRESPONDING SHUT-OFF DEVICE

(71) Applicant: FOCUS-ON V.O.F., Dordrecht (NL)

(72) Inventors: Cornelis Johannes Hogendoorn, Spijk (NL); Stefan van Caspel, Rotterdam (NL)

( * ) Notice: Subject to any disclaimer, the term of this patent is extended or adjusted under 35 U.S.C. 154(b) by 377 days.

(21) Appl. No.: 17/819,477

(22) Filed: Aug. 12, 2022

(65) Prior Publication Data

US 2023/0050903 A1 Feb. 16, 2023

(30) Foreign Application Priority Data

Aug. 13, 2021 (EP) ..................................... 21191276

(51) Int. Cl.
*G05D 7/06* (2006.01)
*G05B 19/416* (2006.01)

(52) U.S. Cl.
CPC ......... *G05D 7/0623* (2013.01); *G05B 19/416* (2013.01); *G05D 7/0635* (2013.01); *G05B 2219/37371* (2013.01)

(58) Field of Classification Search
CPC .. G05D 7/0623; G05D 7/0635; G05B 19/416; G05B 2219/37371; F16K 37/005
See application file for complete search history.

(56) References Cited

U.S. PATENT DOCUMENTS

| | | | | |
|---|---|---|---|---|
| 4,355,657 | A | * 10/1982 | Reip | .................... G05D 16/166 |
| | | | | 137/469 |
| 6,865,523 | B2 | * 3/2005 | Varghese | .................. F15D 1/10 |
| | | | | 703/2 |
| 2003/0019978 | A1 | * 1/2003 | Varghese | .................. F15D 1/10 |
| | | | | 244/204 |
| 2009/0194289 | A1 | * 8/2009 | Clem | ..................... E21B 43/32 |
| | | | | 166/305.1 |

(Continued)

FOREIGN PATENT DOCUMENTS

JP 59013185 A 1/1984

OTHER PUBLICATIONS

Haozhe, Jin, et al; "Failure analysis of a high pressure differential regulating valve in coal liquefaction"; Engineering Failure Analysis, vol. 55; Elsevier, Science Direct; Sep. 2015; 16 Pages.

(Continued)

*Primary Examiner* — Ziaul Karim
(74) *Attorney, Agent, or Firm* — Patrick D. Duplessis

(57) ABSTRACT

A computer-implemented method for operating a shut-off device for a fluid includes: using a mathematical model to calculate a current static fluid pressure at a location of interest within a shut-off device as a function of at least one measured state variable of the fluid; determining a vapor pressure of the fluid; comparing a current static fluid pressure with a cavitation limit value which is dependent on a vapor pressure of the fluid; and in the event of the calculated current static fluid pressure falling below the cavitation limit value dependent on the vapor pressure of the fluid, signaling (Continued)

the presence or expected presence of cavitation at the location of interest of the shut-off device. A related shut-off device is also disclosed.

11 Claims, 3 Drawing Sheets

(56) References Cited

U.S. PATENT DOCUMENTS

2009/0221902 A1* 9/2009 Myhr .................. A61N 7/02
601/2
2018/0217615 A1* 8/2018 Westmoreland .... G01M 3/3245

OTHER PUBLICATIONS

Mingxing, Han, et al; "A numerical investigation in characteristics of flow force under cavitation state inside the water hydraulic poppet valves"; International Journal of Heat and Mass Transfer, vol. 111; Sceince Direct, Elsevier; Aug. 2017; 16 Pages.

* cited by examiner

COMPUTER-IMPLEMENTED METHOD FOR OPERATING A SHUT-OFF DEVICE FOR A FLUID AND A CORRESPONDING SHUT-OFF DEVICE

TECHNICAL FIELD

The invention relates to a computer-implemented method for operating a shut-off device for a fluid, with a housing conducting the fluid, with an in-flow opening for the fluid, which opening is provided in the housing and with an outflow opening for the fluid, which opening is provided in the housing, with a flow channel formed in the housing for the fluid between the in-flow opening and the outflow opening, and with a blocking device arranged in the flow channel with an adjustable flow cross-section for the fluid in the blocking device and thus in the flow channel and with a control and evaluation unit for actuating the blocking device and for acquiring state variables of the shut-off device. Furthermore, the invention also relates to a corresponding shut-off device with which it is possible to carry out the computer-implemented process.

BACKGROUND

Shut-off devices for fluids, essentially for gaseous or liquid media, have been in use for a long time in very different technical designs, whether in processing plants (e.g. food industry, chemicals, petroleum processing) in building installations or, for example, also in medical technology and in automotive engineering including aerospace. The blocking devices of the shut-off devices usually have a blocking body receptacle and a movable blocking body in the blocking body receptacle, wherein the flow cross-section for the fluid in the blocking device and thus in the flow channel can be changed by moving the blocking body in the blocking body receptacle.

The blocking devices of the shut-off devices are often controlled automatically in order to adjust the flow rate of the fluid flowing through the shut-off device as part of a higher-level control or regulation system. The blocking device or the blocking body of the shut-off device is then moved by an electrically, hydraulically or pneumatically driven actuator. By deflecting the blocking body in the blocking body receptacle of the shut-off device, the flow cross-section in the area of the blocking device is varied and with it the flow resistance, so that the desired effect of adjusting the flow rate is achieved. It follows from the above that a shut-off device is not to be understood here as a device that either completely closes or completely opens a flow path. Rather, the flow path for the fluid can be continuously influenced, so that the shut-off device works as a flow or also pressure regulator.

As with other fluid power applications, the occurrence of cavitation within the shut-off devices considered here is problematic. Cavitation is the effect of emerging gas bubbles within the fluid in areas of low static fluid pressure, namely when the static fluid pressure drops below the vapor pressure of the fluid. Regions of low static fluid pressure typically exist where structural parts have the fluid flowing around them at high velocity. When the fluid pressure rises again above the vapor pressure of the fluid, a bubble implosion occurs with significant local pressure peaks that can damage nearby structural elements, in this case mechanical elements of the shut-off device.

SUMMARY

Therefore, the task of the present invention is to make the occurrence of cavitation events within the shut-off device detectable.

In the method described at the outset for operating a shut-off device for a fluid, the previously derived task is solved by first using a mathematical model to calculate the current static fluid pressure at a location of interest within the shut-off device as a function of at least one measured state variable of the fluid. By this is meant that the mathematical model in question is also only capable of calculating the static fluid pressure at this location of interest and not quite generally at any location in the shut-off device. This limitation generally allows the mathematical model to be extremely simplified. The location of interest must be pre-determined to create the mathematical model. In considering what is a reasonable location of interest in the shut-off device, other tools can be used in advance, such as computational fluid dynamics (CFD) methods. These methods can be used to determine the fluidic quantities of interest very precisely in the geometry of the shut-off device, depending on certain boundary conditions, such as the set flow cross-section, the type of fluid, the pressure at the inflow opening, the flow velocity, the temperature of the fluid, and so on. Once the location of interest is found, for example in the vicinity of sensitive design elements or generally in areas of design-related low static fluid pressures, the mathematical model used can be tuned only to this location of interest—or to a limited number of locations of interest. Pre-selecting the location of interest—or the limited number of locations of interest—makes the mathematical model for determining the static fluid pressure at that location of interest simple in principle, since there is no dependence on location coordinates.

The method also involves determining the vapor pressure of the fluid, especially, of course, at the location of interest for which the current static fluid pressure is also calculated. It may be that the vapor pressure is assumed to be the same everywhere in the shut-off device and depends, for example, only on the temperature of the fluid. This is not important in detail. The vapor pressure of the fluid can also be determined, for example, by receiving information from an external source, but the vapor pressure can also be determined, for example, by storing a tabular relationship between the temperature of the fluid and the vapor pressure of the fluid in the control and evaluation unit and determining the vapor pressure of the fluid according to the measured temperature of the fluid.

The current static fluid pressure is compared with a cavitation limit value that depends on the vapor pressure of the fluid. In the case of the calculated current static pressure falling below the cavitation limit value, the presence or expected presence of cavitation at the location of interest in the shut-off device is then signaled. Thus, a corresponding information can be stored in the control and evaluation unit, a corresponding signal can be communicated to the outside via a data interface of the shut-off device, for example, to a control station, etc. By signaling the presence or the expected presence of a cavitation event, it is possible to actively intervene in the flow process in order to stop the cavitation, it is possible to make an estimation about the state of the shut-off device by logging the cavitation events, it is not only possible to draw conclusions about the state of the shut-off device, the information about the presence of cavitation can also be used to detect the state of the flow environment in which the shut-off device is integrated. The possibilities for evaluating a signaled cavitation event are far-reaching, and the signaling of cavitation has considerable added value for the user of the shut-off device.

In a preferred embodiment, the location of interest within the shut-off device is chosen to be the location of the fluidic lowest static fluid pressure. This can be determined, for example, in advance of the creation of the mathematical model via a numerical flow simulation. The advantage is that the actual occurrence of a cavitation event can be inferred, since the determination of the cavitation event is based on the lowest physical threshold. In the case of the shut-off devices considered here, this location is often found in the vicinity of the adjustable flow cross-section of the blocking device, partly because the highest flow velocities occur here. In this respect, in a further preferred embodiment of the method or of the shut-off device, it is provided that the location of interest lies within the shut-off device in the flow cross-section for the fluid in the blocking device. Frequently, the location of the fluidic lowest static fluid pressure is actually also located in the vicinity of the flow cross-section within the blocking device, but a location can also be selected that is located in closer proximity to the mechanical elements of the shut-off device involved and therefore cavitation occurring there have a higher damage potential than cavitation occurring earlier at other locations.

Another preferred embodiment is characterized by the fact that the cavitation limit value, which depends on the vapor pressure of the fluid, is the vapor pressure of the fluid itself, so it is tested for the lowest-threshold occurrence of cavitation with pinpoint accuracy. Accordingly, if the cavitation limit value is chosen differently, it is also possible to test, for example, for an imminent—but not yet occurred—cavitation event.

A preferred embodiment of the method or the shut-off device is characterized by the fact that the mathematical model is based on the Bernoulli equation and the measured state variable is a fluid pressure within the shut-off device and/or a flow velocity of the fluid within the shut-off device. Bernoulli's equation is based on the application of the conservation of energy along a flow thread within a flowing fluid. It has been found that, with a simplified consideration of the geometry of the shut-off device or the flow channel of the shut-off device, the Bernoulli equation can be applied very advantageously and in a simple manner. The individual terms of Bernoulli's equation can be determined with comparatively little computational effort, so that the method described here can be carried out with the usual hardware-related computer equipment of the shut-off device, i.e., for example, with a microcontroller or a digital signal processor.

The design conditions of the particular shut-off device operated with the method described here can be taken into account in the Bernoulli equation with at least one correction factor, which can be usefully applied in particular before the quadratic terms of the flow velocities. A further preferred embodiment example is characterized in that the mathematical model and the method steps are calculated and carried out with the control and evaluation unit. Alternatively, the method steps are calculated and executed on a computing unit outside the shut-off device. The recorded values of the required state variables are transmitted via a communication channel from the shut-off device to the external computing unit.

As has already been explained several times, the task derived at the outset is also solved in the case of a shut-off device for a fluid, with a housing guiding the fluid, with an inflow opening for the fluid provided in the housing and with an outflow opening for the fluid provided in the housing, with a flow channel for the fluid formed in the housing between the inflow opening and the outflow opening, with a blocking device arranged in the flow channel and having an adjustable flow cross-section for the fluid in the blocking device and thus in the flow channel, and with a control and evaluation unit for controlling the blocking device and for detecting state variables of the shut-off device, which also include the state variables of the fluid flowing in the shut-off device.

The derived task is solved in the case of the shut-off device described above in that the control and evaluation unit uses a mathematical model to calculate the current static fluid pressure at a location of interest within the shut-off device as a function of at least one measured state variable of the fluid, in that the control and evaluation unit determines the vapor pressure of the fluid, in that the control and evaluation unit compares the current static fluid pressure with a cavitation limit value which is dependent on the vapor pressure of the fluid, and in that the control and evaluation unit signals the presence or the expected presence of cavitation at the location of interest of the shut-off element in the case of the calculated current static fluid pressure falling below the cavitation limit value.

The control and evaluation unit as a whole is designed and arranged such that it can carry out the previously described method steps either on its own or in combination.

A further development of the shut-off device is characterized in that the medium pressure on the inflow side and the medium pressure on the outflow side are each acquired with a pressure sensor, and that a flow velocity of the medium in the flow channel is acquired with a flow channel, in particular with a flow sensor based on ultrasonic waves.

BRIEF DESCRIPTION OF THE DRAWINGS

As explained, there are different possibilities for designing and further developing the method according to the invention and the shut-off device according to the invention. Preferred embodiments are described below on the basis of the drawings.

DETAILED DESCRIPTION

Figure 1:
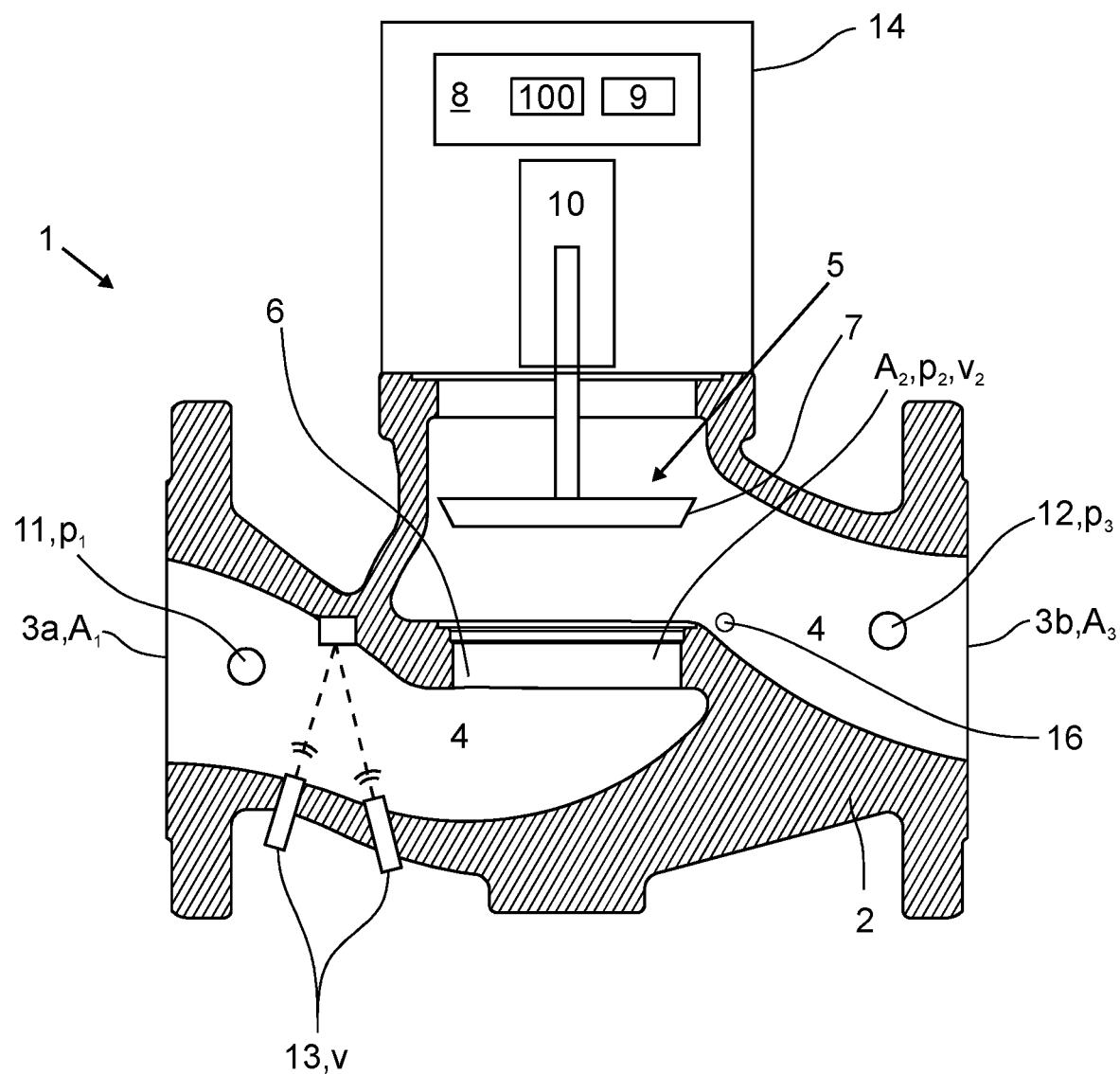
FIG. 1 schematically illustrates a first embodiment of a shut-off device according to the invention.
Figure 2:
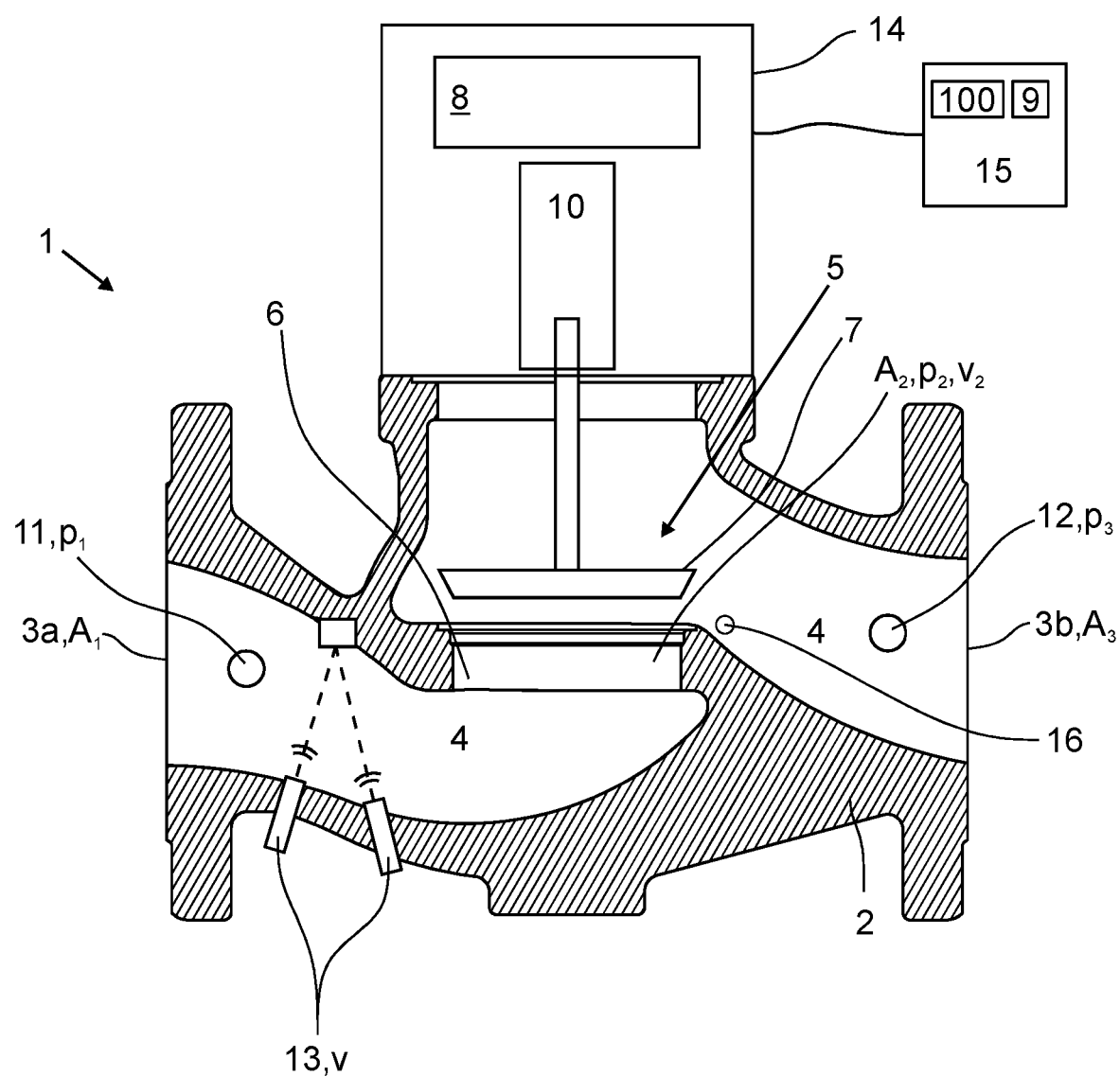
FIG. 2 schematically illustrates a further embodiment of a shut-off device according to the invention.
Figure 3:
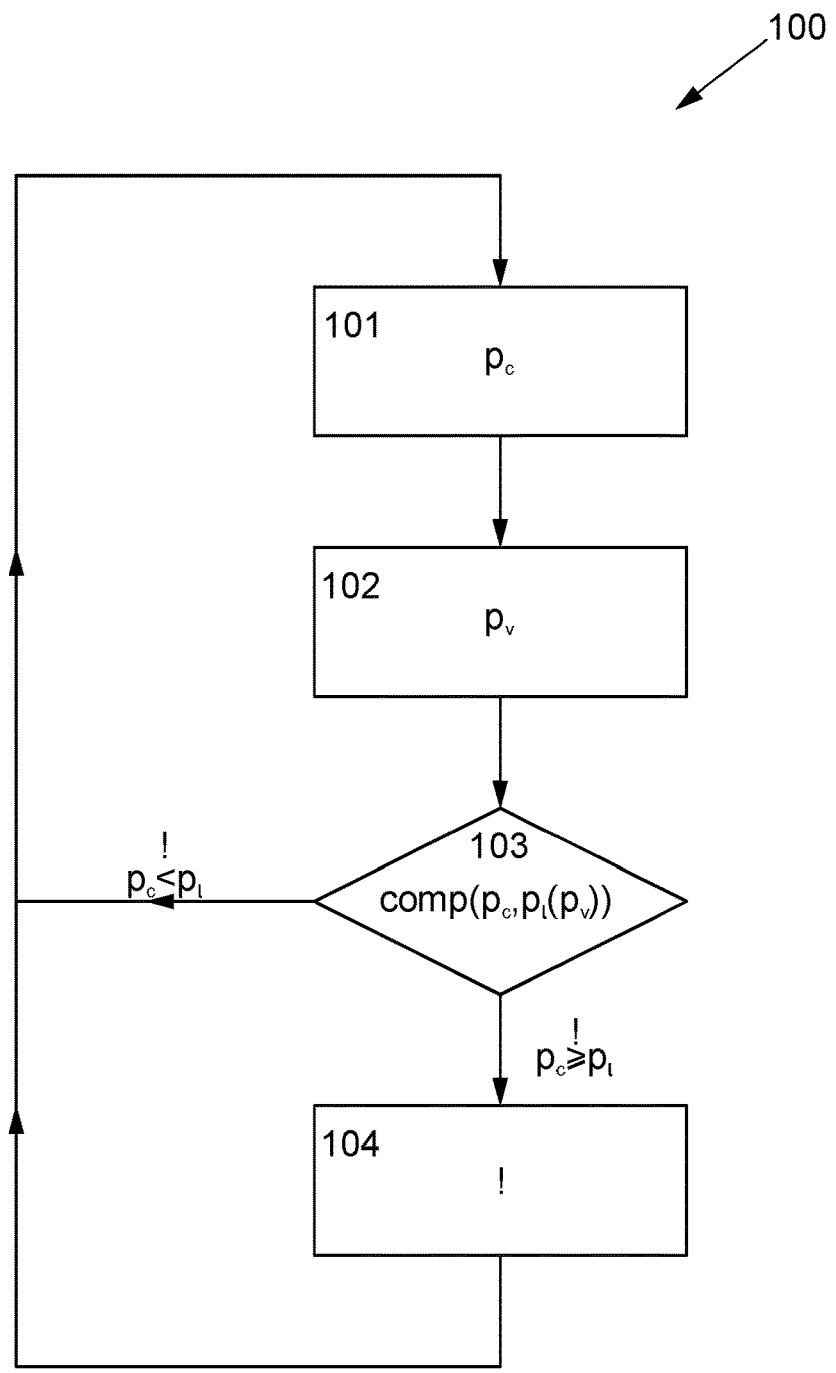
FIG. 3 schematically illustrates a method according to the invention for operating a shut-off device.

FIGS. 1 to 3 each schematically show a computer-implemented method 100 for operating a shut-off device 1 for a fluid. In FIGS. 1 and 2, the emphasis is on the representation of shut-off device 1, in FIG. 3 the emphasis is on the schematic representation of the computer-implemented method 100.

In FIGS. 1 and 2 it can be seen that the shut-off device 1 has a fluid-conducting housing 2 with an inflow opening 3a with a cross-section $A_1$ for the fluid, which opening is provided in the housing 2 and with an outflow opening 3b with a cross-section $A_3$ for the fluid, which opening is provided in the housing 2. A flow channel 4 for the fluid is formed in the housing 2 between the inflow opening 3a and the outflow opening 3b. A blocking device 5 with an adjustable flow cross-section $A_2$ for the fluid is arranged in the flow channel 4. The blocking device 5 is implemented here by a blocking body receptacle 6 and a blocking body 7. By deflecting the blocking body 7 by means of an actuator

10, the flow cross-section $A_2$ for the fluid can be varied. If the blocking body 7 is located in the blocking body seat 6, the flow cross-section $A_2$ is closed for the fluid, the flow resistance is therefore at its highest, if the blocking body 7 is completely retracted, the flow cross-section $A_2$ is maximally open for the fluid and the flow resistance for the fluid is therefore at its lowest. However, the exact design of the blocking device 5 is not important here; it could also be implemented differently, for example as a gate valve, butterfly valve or ball valve.

The shut-off device 1 also includes a control and evaluation unit 8 for actuating the blocking device 5 for detecting state variables of the shut-off device 1 and of the fluid flowing in the shut-off device 1.

With the method 100 illustrated in FIGS. 1 to 3 for operating the shut-off device 1 and with the corresponding shut-off device 1, it is possible in a simple manner to detect the occurrence or also the imminent occurrence of cavitation within the shut-off device 1.

The method 100 for operating the shut-off device 1 and the corresponding shut-off device 1 shown in FIGS. 1 to 3 are characterized firstly by the fact that a mathematical model 9 is used to calculate the current static fluid pressure $p_c$ at a location of interest 16 within the shut-off device 1 as a function of at least one measured state variable of the fluid 101. The mathematical model is thus chosen to be capable of calculating the current static fluid pressure $p_c$ at a specific location only—or at a limited number of predetermined, i.e. fixed, locations—possibly even at a few predetermined fixed locations, which in any case makes the mathematical model 9 simple compared to a model capable of calculating the static fluid pressure $p_v$ at any location in the shut-off device 1 depending on location coordinates as input variables.

In addition, the vapor pressure $p_v$ of the fluid is determined 102. In which order the method steps 101 and 102 are executed is irrelevant.

Finally, the current static fluid pressure $p_c$ is compared with a cavitation limit value $p_l$ that depends on the vapor pressure $p_v$ of the fluid 103, indicated in FIG. 3 by the expression comp($p_c$, $p_l(p_v)$) in method step 103. In the case of the calculated current static pressure $p_c$ falling below the cavitation limit value $p_l$ dependent on the vapor pressure $p_v$ of the fluid, the presence or expected presence of cavitation at the location of interest 16 of the shut-off device 1 is signaled 104, symbolized in FIG. 3 by the exclamation mark in method step 104.

In the embodiments in FIGS. 1 and 2, the location of interest 16 within the shut-off device 1 has been selected as the location of the fluidic lowest static fluid pressure. This location of interest 16 has been located in advance by a numerical fluidic calculation. At the same time, the location of interest 16 is located near the flow cross-section for the fluid in the blocking device 5. Cavitation occurring there is also potentially damaging due to its proximity to structural parts of the blocking device 5. Dependent on the geometry of the shut-off device 1 or the severity of the cavitation, the location of interest could also be at an other location.

In the embodiments shown here, the cavitation limit value $p_l$ that depends on the vapor pressure $p_v$ of the fluid is the vapor pressure $p_v$ of the fluid itself, so that testing is done for the actual occurrence of cavitation rather than for an expected cavitation event should the current static fluid pressure $p_c$ drop even further.

The mathematical model 9 can be an analytical description of the physical relationships in the mathematical sense, for example in the form of a state-space representation of state variables of the shut-off device 1 known from systems theory. However, the relationships for determining the static fluid pressure $p_c$ do not necessarily have to be recorded analytically; they can also be recorded, for example, in the form of tabular characteristic diagrams, as a neural network or in the form of other description variants known from the mathematical modeling of physical systems.

A particularly advantageous variant of the mathematical model 9 is based on the Bernoulli equation, which describes the conservation of energy along a flow path (Eq. 1):

$$p + \rho h g + \frac{1}{2}\rho v^2 = const$$

The specific pressure and position energy as well as the specific kinetic energy are included. $\rho$ is the density of the fluid. In the presence of a relevant flow resistance, a pressure loss resulting over the length of the considered flow path must be considered (Eq. 2):

$$p_1 - p_2 = \rho g(h_2 - h_1) + \frac{1}{2}\rho(v_2^2 - v_1^2) + \Delta p$$

$\Delta p$ is the pressure difference over the flow path under consideration, i.e. it corresponds to the pressure difference $p_1-p_3$ if the flow path extends over the entire length of the shut-off device 1. If the flow path runs on a gravitational equipotential surface, the related term with the height difference $h_2-h_1$ is omitted. The fluid is assumed to be incompressible. If this assumption is no longer valid, the change in density should be taken into account.

It has been found that the actual fluidic conditions in the shut-off device 1 can be approximated very well by a highly simplified geometric consideration using simplifying assumptions. The rather complicated geometry of the flow channel 4 of the shut-off device 1 is considered in a simplified way as a linear flow course starting with the inflow opening 3a (with the flow cross-section $A_1$ and the pressure $p_1$ and the flow velocity $v_1$), via the constriction in the blocking device 5 (with the flow cross-section $A_2$, the pressure $p_2$ prevailing there and the flow velocity $v_2$), to the outflow opening 3b (with the flow cross-section $A_3$, the pressure $p_3$ prevailing there and the flow velocity $v_3$).

As already explained above, in the embodiment examples shown, the pressure $p_2$ in the flow cross-section of the blocking device 5 is of interest, since the aim is to test for the lowest static fluid pressure that exists in the flow cross-section of the blocking device 5 according to a previously performed fluidic investigation. The pressure $p_2$ is therefore the current static fluid pressure $p_c$ at the location 16 of interest, i.e. in—or near—the flow cross-section of the blocking device 5. Having said this, Eq. 2 can be rewritten as follows (Eq. 3):

$$p_c = p_1 + \alpha\frac{1}{2}\rho_l v_1^2 - \beta\frac{1}{2}\rho_l v_2^2 - \Delta p$$

Obviously, the $\alpha$-term in equation 3 can be omitted in the case that the velocity $v_2$ is much larger than the velocity $v_1$.

The state variables of shut-off device 1 occurring here can be determined in various ways. They can be measured directly, but in some cases they can also be determined indirectly. For example, it is not necessary to measure the flow velocity $v_2$ in the flow cross-section $A_2$ of the blocking device 5 if the flow velocity $v_1$ is already known—by measurement—and the flow cross-section $A_2$ in the blocking device 5 is also known because the setting position of the blocking body 7 is a known state variable. This will be explained below. The Bernoulli equation according to Eq. 3 is provided with two correction factors $\alpha$, $\beta$, which serve to adapt the Bernoulli equation to the structural design of the shut-off device 1. These correction factors can be determined within the scope of calibration measurements for a type of shut-off device 1, for example by known statistical curve fitting methods, or by calculations based on computational fluid dynamics.

In the present case, the correction factors $\alpha$, $\beta$ are dependent on the state variable of the flow velocity of the fluid within the shut-off device 1, with the transition between laminar and turbulent flow playing a role in particular.

In the simple approach to the uniform description of a mathematical model 9 of the shut-off device 1 shown here, first the flow and pressure conditions are considered from the inflow-side cross-section $A_1$ to the cross-section $A_2$ in the variable constriction of the blocking device 5 and then the flow and pressure conditions are considered from the cross-section $A_2$ in the variable constriction of the blocking device 5 to the outflow-side cross-section $A_3$. The flow cross section $A_2$ depends on the position of the blocking body 7 and thus on its distance from the blocking body seat 6. For the two sections, i.e. from the inflow side to the blocking device 5 and from the blocking device 5 to the outflow side, the pressure loss coefficients K can be given as follows (equations 4 and 5):

$$K_{1 \to 2} = 0.5\left(1 - \frac{A_2}{A_1}\right)$$

$$K_{2 \to 3} = \left(1 - \frac{A_2}{A_3}\right)^2$$

The pressure loss in the two sections mentioned above can be formulated as follows using the pressure loss coefficients shown above (equations 6 and 7):

$$p_1 - p_2 = K_{1 \to 2} \frac{1}{2}\rho_l v_2^2 = 0.5\left(1 - \frac{A_2}{A_1}\right)\frac{1}{2}\rho_l v_2^2$$

$$p_2 - p_3 = K_{2 \to 3} \frac{1}{2}\rho_l v_2^2 = \left(1 - \frac{A_2}{A_3}\right)^2 \frac{1}{2}\rho_l v_2^2$$

Here, $p_1$, $p_2$ and $p_3$ are the inflow, the blocking device 5 and outflow pressures 3b. $\rho_l$ is the density of the fluid and v is the flow velocity. The relationships shown here are based on the assumption of an incompressible fluid. For the sake of completeness, it is pointed out that corresponding relationships can also be formulated for compressible fluids without further consideration. By adding equations 6 and 7 to describe the pressure drop and assuming that the inflow cross-section $A_1$ is equal to the outflow $$(p_1 - p_2) + (p_2 - p_3) = \frac{1}{2}\rho_l v_2^2 \cdot 0.5\left(1 - \frac{A_2}{A_1}\right) + \frac{1}{2}\rho_l v_2^2 \cdot \left(1 - \frac{A_2}{A_3}\right)^2$$

$$(p_1 - p_3) = \frac{1}{2}\rho_l v_2^2 \cdot \left(0.5\left(1 - \frac{A_2}{A_1}\right) + \left(1 - \frac{A_2}{A_1}\right)^2\right)$$

-continued $$\Delta p = \frac{1}{2}\rho_l v_1^2 \cdot \left(\frac{A_1}{A_2}\right)^2 \left(0.5\left(1 - \frac{A_2}{A_1}\right) + \left(1 - \frac{A_2}{A_1}\right)^2\right)$$

cross-section $A_3$, the following relationships are obtained by eliminating $p_2$ (equations 8 to 10):

The cross-sectional area $A_2$ of flow depends on the valve position and can be determined simply by knowing the position of the shut-off valve 7.

In FIG. 1, it is shown that the mathematical model 9 is stored in the control and evaluation unit 8 in a housing supplement 14—transmitter housing—and consequently the computer-implemented method 100 is also executed there. The control and evaluation unit 8 is usually an embedded computer based on a microcontroller or a digital signal processor. The exact technical design is not important here. The solution in the design in FIG. 2 deviates from this. Here the mathematical model 9 is stored in an external computing unit 15, for example in a process control system. The acquired state variables are transmitted here from the control and evaluation unit 8 to the external computing unit 15 via a field bus, wherein the further method steps are then executed in the external computing unit 15.

The state variables measured for the shut-off device 1 are the medium pressure $p_1$ on the inflow side, which is detected via the pressure sensor 11 on the inflow side, the medium pressure $p_3$ on the outflow side, which is detected via the pressure sensor 12 on the outflow side, and a flow velocity v of the medium in the flow channel 4, which is detected via ultrasonic sensors 13 via a transit time measurement. The flow velocity v could as well be calculated by equation 10, i.e. the velocity v does not necessarily have to be measured. In the case of incompressible fluids, the flow velocity v determined in the cross section of the flow velocity v measurement can be converted very easily to any other cross section in the flow channel 4. The sensors are only shown schematically in FIGS. 1 and 2. For clarity, no wiring is shown between the sensors and the control and evaluation unit 8. The pressure difference $\Delta p$ could also be calculated using equation 10. The additional measurement of $p_3$ results in a redundancy that can be used for diagnostic purposes.

The invention claimed is:

1. A computer-implemented method for operating a shut-off device for a fluid, with a housing conducting the fluid, with an inflow opening for the fluid, wherein the inflow opening is provided in the housing and with an outflow opening for the fluid, wherein the outflow opening is provided in the housing, with a flow channel formed in the housing for the fluid between the inflow opening and the outflow opening, and with a blocking device arranged in the flow channel with an adjustable flow cross-section for the fluid in the blocking device and thus in the flow channel and with a control and evaluation unit for actuating the blocking device, the method comprising:

using a first pressure sensor to acquire a first pressure of the fluid on the inflow opening of the shut-off device;

using a second pressure sensor to acquire a second pressure of the fluid on the outflow opening of the shut-off device;

using ultrasonic sensors to detect a flow velocity of the fluid within the shut-off device;

using a mathematical model to calculate a current static fluid pressure at a location of interest within the shut-off device as a function of the first pressure of the fluid on the inflow opening of the shut-off device, the second pressure of the fluid on the outflow opening of the shut-off device, and the flow velocity of the fluid within the shut-off device;

determining a vapor pressure of the fluid;

comparing the current static fluid pressure with a cavitation limit value which is dependent on the vapor pressure of the fluid;

determining the current static fluid pressure is below the cavitation limit value dependent on the vapor pressure of the fluid; and in response to determining the current static fluid pressure is below the cavitation limit value dependent on the vapor pressure of the fluid, signaling a presence or expected presence of cavitation at the location of interest of the shut-off device and actuating the blocking device.

2. The method according to claim 1, wherein the location of interest within the shut-off device is a location of a fluidic lowest static fluid pressure.

3. The method according to claim 1, wherein the location of interest is within the shut-off device in the adjustable flow cross-section for the fluid in the blocking device.

4. The method according to claim 1, wherein the cavitation limit value dependent on the vapor pressure of the fluid is the vapor pressure of the fluid itself.

5. The method according to claim 1, wherein the mathematical model is based on Bernoulli's equation.

6. The method according to claim 5, wherein the Bernoulli equation is provided with at least one correction factor for adapting the Bernoulli equation to a constructive design of the shut-off device.

7. The method according to claim 6, wherein the at least one correction factor is dependent on the flow velocity of the fluid within the shut-off device.

8. The method according to claim 6, wherein the mathematical model based on Bernoulli's equation has the following form:

$$p_c = p_1 + \alpha \frac{1}{2}\rho_l v_1^2 - \beta \frac{1}{2}\rho_l v_2^2 - \Delta p$$

9. The method according to claim 1, wherein the mathematical model is calculated and carried out using the control and evaluation unit, or the mathematical model is calculated and carried out on a computing unit external to the shut-off device, and the first pressure of the fluid on the inflow opening of the shut-off device, the second pressure of the fluid on the outflow opening of the shut-off device, and the flow velocity of the fluid within the shut-off device are transmitted from the shut-off device to the computing unit external to the shut-off device via a communication channel.

10. A shut-off device for a fluid, comprising:
a housing conducting the fluid;
an inflow opening for the fluid, which the inflow opening is provided in the housing;
an outflow opening for the fluid, which the outflow opening is provided in the housing;
a flow channel formed in the housing for the fluid between the inflow opening and the outflow opening;
a blocking device arranged in the flow channel with an adjustable flow cross-section for the fluid in the blocking device and thus in the flow channel;
a first pressure sensor for acquiring a first pressure of the fluid on the inflow opening;
a second pressure sensor for acquiring a second pressure of the fluid on the outflow opening;
ultrasonic sensors for detecting a flow velocity of the fluid within the shut-off device; and
a control and evaluation unit for actuating the blocking device and for acquiring the first pressure, the second pressure, and the flow velocity from the first pressure sensor, the second pressure sensor, and the ultrasonic sensors, respectively;
wherein the control and evaluation unit uses a mathematical model to calculate a current static fluid pressure at a location of interest within the shut-off device as a function of the first pressure, the second pressure, and the flow velocity;
wherein the control and evaluation unit determines a vapor pressure of the fluid;
wherein the control and evaluation unit compares the current static fluid pressure with a cavitation limit value which is dependent on the vapor pressure of the fluid;
wherein the control and evaluation unit determines the current static fluid pressure is below the cavitation limit value dependent on the vapor pressure of the fluid; and
wherein, in response to determining the current static fluid pressure is below the cavitation limit value dependent on the vapor pressure of the fluid, the control and evaluation unit signals a presence or expected presence of cavitation at the location of interest of the shut-off device and actuates the blocking device.

11. The shut-off device according to claim 10, wherein the control and evaluation unit is designed and arranged such that at least one of:
the location of interest within the shut-off device is a location of a fluidic lowest static fluid pressure;
the location of interest is within the shut-off device in the adjustable flow cross-section for the fluid in the blocking device;
the cavitation limit value dependent on the vapor pressure of the fluid is the vapor pressure of the fluid itself;
the mathematical model is based on Bernoulli's equation;
the Bernoulli equation is provided with at least one correction factor for adapting the Bernoulli equation to a constructive design of the shut-off device;
the at least one correction factor is dependent on the flow velocity of the fluid within the shut-off device;
the mathematical model based on Bernoulli's equation has the following form:

$$p_c = p_1 + \alpha \frac{1}{2}\rho_l v_1^2 - \beta \frac{1}{2}\rho_l v_2^2 - \Delta p;$$

the flow velocity is either determined by ultrasonic measurement, or the flow velocity is calculated in dependency of measured pressures in the shut-off device, especially using the following relationship:

$$\Delta p = \frac{1}{2}\rho_l v_1^2 \cdot \left(\frac{A_1}{A_2}\right)^2 \left(0.5\left(1 - \frac{A_2}{A_1}\right) + \left(1 - \frac{A_2}{A_1}\right)^2\right);$$

and the mathematical model is calculated and carried out with the control and evaluation unit, or the mathematical model is calculated and carried out on a computing unit external to the shut-off device, and the first pressure, the second pressure, and the flow velocity from the first pressure sensor, the second pressure sensor, and the ultrasonic sensors, respectively, are transmitted from the shut-off device to the external computing unit via a communication channel.

* * * * *